US012732675B2

(12) United States Patent
Zhuang

(10) Patent No.: US 12,732,675 B2
(45) Date of Patent: Sep. 8, 2026

(54) IMAGING DEVICE AND METHOD OF OPERATING THE SAME

(71) Applicant: Sony Group Corporation, Tokyo (JP)

(72) Inventor: Tuo Zhuang, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 376 days.

(21) Appl. No.: 18/566,484

(22) PCT Filed: Feb. 8, 2022

(86) PCT No.: PCT/JP2022/004793
§ 371 (c)(1),
(2) Date: Dec. 1, 2023

(87) PCT Pub. No.: WO2022/264487
PCT Pub. Date: Dec. 22, 2022

(65) Prior Publication Data

US 2024/0364984 A1 Oct. 31, 2024

(30) Foreign Application Priority Data

Jun. 15, 2021 (JP) ................................ 2021-099468

(51) Int. Cl.
*H04N 23/16* (2023.01)
*G01N 21/64* (2006.01)
*G02B 5/28* (2006.01)

(52) U.S. Cl.
CPC ......... *H04N 23/16* (2023.01); *G01N 21/6428* (2013.01); *G01N 21/6456* (2013.01); *G02B 5/28* (2013.01); *G01N 2021/6439* (2013.01)

(58) Field of Classification Search
None
See application file for complete search history.

(56) References Cited

U.S. PATENT DOCUMENTS 5,181,013 A * 1/1993 Bagshaw .......... G02F 1/133524
348/E9.014
5,608,577 A * 3/1997 Eda ...................... G02B 5/0833
359/580

(Continued)

FOREIGN PATENT DOCUMENTS

CN 108645824 A * 10/2018 ......... G01N 21/6486
DE 102014218202 A1 * 3/2016 ........... A61B 5/0077

(Continued)

OTHER PUBLICATIONS

Merriam-Webster (Ed.). (2016). Index of refraction. In Merriam-Websteras Medical Dictionary (1st ed.). https://access.infobase.com/article/1002531-index-refraction?aid=279753 (Year: 2016).*

(Continued)

*Primary Examiner* — David E Smith
*Assistant Examiner* — Alina Kaliszewski
(74) *Attorney, Agent, or Firm* — Paratus Law Group, PLLC

(57) ABSTRACT

An imaging device for reducing a processing load of signal processing using two images of different wavelengths, and a method of operating the imaging device. The phases of two incident light beams having different wavelengths are matched, the two incident light beams are polarized into the same polarization direction, a wavelength of one incident light beam of the two types of polarized incident light beams is matched with a wavelength of the other incident light beam, a phase difference is adjusted such that the phase difference between the one incident light beam and the other incident light beam is π, the two types of incident light beams being matched with the wavelength of the one incident light beam, and an imaging element simultaneously receives the two types of incident light beams adjusted such (Continued)

that the phase difference is π, thereby, optically acquiring the subtraction results of two types of power.

14 Claims, 9 Drawing Sheets

(56) References Cited

U.S. PATENT DOCUMENTS 7,916,304 B2* 3/2011 Hess .................. G02B 21/0076 359/370
8,908,174 B2* 12/2014 Kempe .............. G01N 21/6428 356/317
2009/0121153 A1* 5/2009 Baer .................. G01N 21/6458 250/492.1
2009/0293955 A1* 12/2009 Kothari ................ G02B 26/001 257/E31.003
2010/0202055 A1* 8/2010 Norton .................. G01J 3/0297 359/558
2011/0244190 A1* 10/2011 Yoshizawa ............... G02B 5/28 428/166
2015/0132766 A1* 5/2015 Yasuda ............ G01N 33/57595 435/7.1
2016/0073043 A1* 3/2016 Stork ..................... G06V 40/19 348/164
2016/0305883 A1* 10/2016 Betzig .................... G02B 21/16
2017/0184449 A1* 6/2017 Ozawa .................. G01J 3/0224
2017/0336326 A1* 11/2017 Sirat .................. G02B 21/0076
2017/0343475 A1* 11/2017 Yamada ............. G01N 21/6428
2018/0017493 A1* 1/2018 Nakamura ............ G01J 3/0202
2019/0056212 A1 2/2019 Zhu
2019/0273856 A1* 9/2019 Hirasawa ............... H04N 23/75
2020/0271585 A1* 8/2020 Sasaki ................ G01N 15/1459
2021/0215605 A1* 7/2021 Schmid ................. H10F 39/802
2021/0381976 A1* 12/2021 Ikehara ..................... G01J 3/10
2022/0381973 A1* 12/2022 Oda ......................... G02B 5/22
2024/0085717 A1* 3/2024 Ni ...................... G01N 21/6486

FOREIGN PATENT DOCUMENTS

JP 2016-008956 A 1/2016
KR 19990016808 A * 3/1999 .......... H04J 14/0307
WO WO 2005/114553 A2 12/2005
WO WO-2011046244 A1 * 4/2011 ............... G02B 5/18
WO WO-2014019309 A1 * 2/2014 ....... G02F 1/133516
WO WO 2016/152108 A1 9/2016
WO WO-2018191593 A1 * 10/2018 ............... G02B 5/28
WO WO-2019216213 A1 * 11/2019 ............ G01J 3/2823
WO WO-2020262679 A1 * 12/2020 ............. H04N 25/70

OTHER PUBLICATIONS

Wave, in physics. (2018). In Columbia University & P. Lagasse, The Columbia Encyclopedia (8th ed.). https://access.infobase.com/article/798727-wave-physics?aid=279753 (Year: 2018).*
English machine translation for WO-2019216213-A1 (Year: 2019).*
English machine translation for KR-19990016808-A (Year: 1999).*
English machine translation for WO-2011046244-A1 (Year: 2011).*
English machine translation for WO-2014019309-A1 (Year: 2014).*
English machine translation for DE-102014218202-A1 (Year: 2016).*
English machine translation for CN-108645824-A (Year: 2018).*
English machine translation for WO-2020262679-A1 (Year: 2020).*
Panda et al., Application of Vegetation Indices for Agricultural Crop Yield Prediction Using Neural Network Techniques, Remote Sensing, 2010, pp. 673-696.

* cited by examiner

FIG. 6

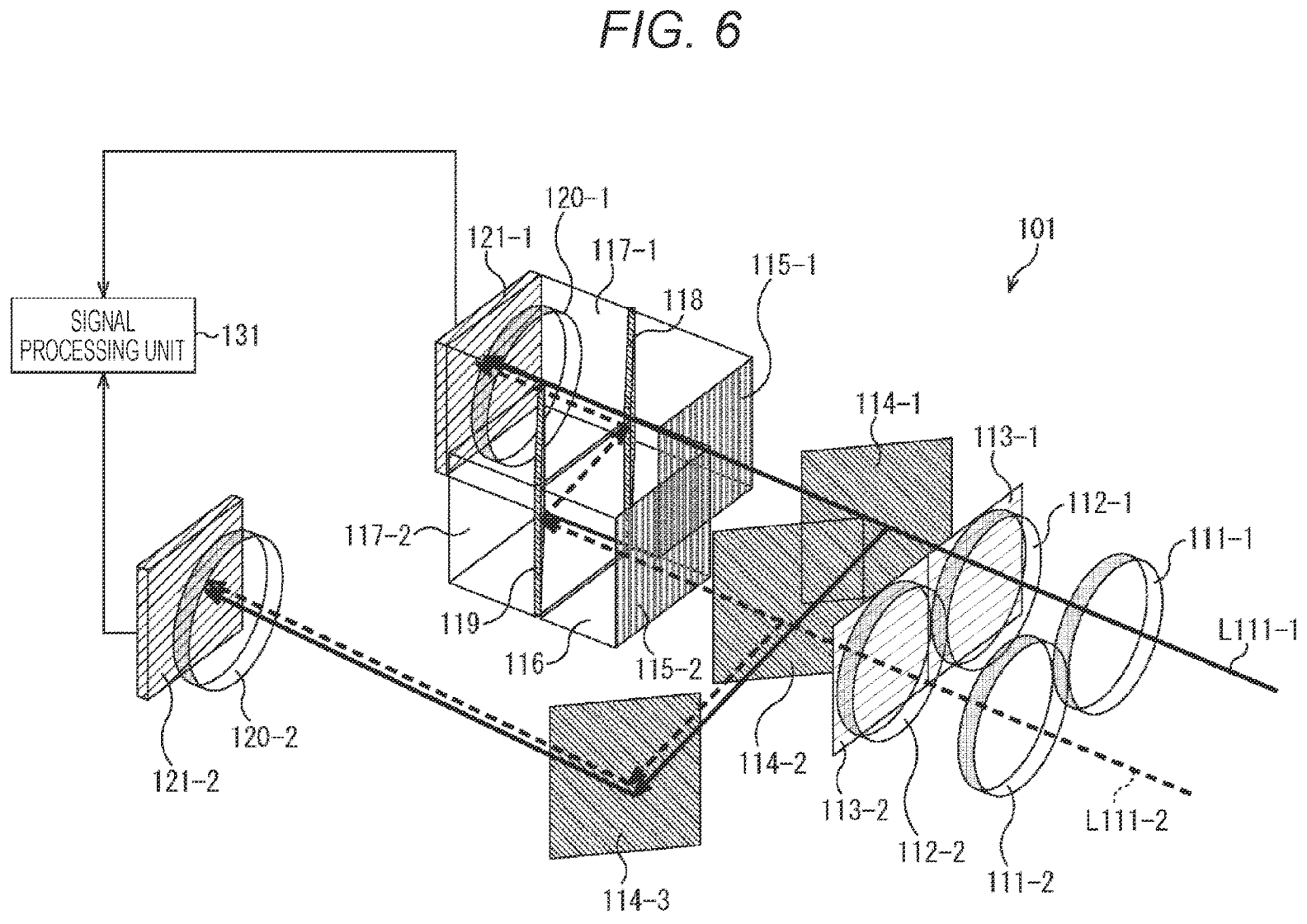

101
L111-1
L111-2
111-1
111-2
112-1
112-2
113-1
113-2
114-1
114-2
114-3
115-1
115-2
116
117-1
117-2
118
119
120-1
120-2
121-1
121-2
SIGNAL PROCESSING UNIT
131

101
L111-1
L111-2
111-1
111-2
112-1
112-2
113-1
113-2
114-1
114-2
114-3
115-1
115-2
116
117-1
117-2
118
119
120-1
120-2
121-1
121-2
131
SIGNAL PROCESSING UNIT

IMAGING DEVICE AND METHOD OF OPERATING THE SAME

CROSS REFERENCE TO PRIOR APPLICATION

This application is a National Stage Patent Application of PCT International Patent Application No. PCT/JP2022/004793 (filed on Feb. 8, 2022) under 35 U.S.C. § 371, which claims priority to Japanese Patent Application No. 2021-099468 (filed on Jun. 15, 2021), which are all hereby incorporated by reference in their entirety.

TECHNICAL FIELD

The present disclosure relates to an imaging device and a method of operating the imaging device, and more particularly, to an imaging device capable of reducing a load on signal processing using an image signal and suppressing decrease in processing speed, and a method of operating the imaging device.

BACKGROUND ART

In the field of computer vision, various processes according to purposes are performed on various captured images.

In particular, in the field of spectral imaging, various pieces of information regarding a characteristic of an object are acquired by performing arithmetic processing on image groups of different wavelengths.

For example, in the field of agriculture, there has been proposed a technique of capturing two images irradiated with light of two specific wavelengths deeply involved in the growth of plants, and performing signal processing using four arithmetic operations such as addition and subtraction, and multiplication or integration of pixel values of the two captured images to grasp the growth situation of the plants (see Non-Patent Document 1 and Patent Document 1).

CITATION LIST

Non Patent Document

Non Patent Document 1: Application of Vegetation Indices for Agricultural Crop Yield Prediction Using Neural Network Techniques https://www.mdpi.com/2072-4292/2/3/673/htm

Patent Document

Patent Document 1: WO 2005/114553

SUMMARY OF THE INVENTION

Problems to be Solved by the Invention

Meanwhile, signal processing as a basis of image processing required for realizing the techniques proposed in Non-Patent Document 1 and Patent Document 1 is four arithmetic operations of pixel values of images (pixels).

Depending on the application, it is required to perform processing at a high speed with very little calculation power, but even simple arithmetic operations may increase the load on the signal processing as the image size increases, and the processing speed decreases.

The present disclosure has been made in view of such a situation, and is directed in particular to reduce a load on the signal processing and suppress processing speed by realizing a part of signal processing using an image signal optically.

Solutions to Problems

An imaging device according to one aspect of the present disclosure includes: a phase adjustment unit that matches phases of incident light including a light beam of a first wavelength and a light beam of a second wavelength that are different; a polarizing plate that polarizes the incident light beams of the first wavelength and the second wavelength into the same polarization direction; a wavelength adjustment unit that matches a wavelength of the incident light beam of the first wavelength polarized by the polarizing plate with a wavelength of the incident light beam of the second wavelength; a phase difference adjustment unit that adjusts a phase difference to be $\pi$, the phase difference being between the incident light beam of the first wavelength and the incident light beam of the second wavelength, the wavelengths of which have been matched by the wavelength adjustment unit; and a first imaging element that simultaneously receives the incident light beams of the first wavelength and the second wavelength having been adjusted by the phase difference adjustment unit such that the phase difference is $\pi$.

A method of operating an imaging device according to one aspect of the present disclosure is a method of operating an imaging device including: a phase adjustment unit; a polarizing plate; a wavelength adjustment unit; a phase difference adjustment unit; and an imaging element. The method of operating the imaging device includes matching, by the phase adjustment unit, phases of incident light including a light beam of a first wavelength and a light beam of a second wavelength that are different; polarizing, by the polarizing plate, the incident light beams of the first wavelength and the second wavelength into the same polarization direction; matching, by the wavelength adjustment unit, a wavelength of the incident light beam of the first wavelength having been polarized by the polarizing plate with a wavelength of the incident light beam of the second wavelength; adjusting, by the phase difference adjustment unit, a phase difference to be $\pi$, the phase difference being between the incident light beam of the first wavelength and the incident light beam of the second wavelength, the wavelengths of which have been matched by the wavelength adjustment unit; and simultaneously receiving, by the imaging element, the incident light beam of the first wavelength and the second wavelength having been adjusted by the phase difference adjustment unit such that the phase difference is $\pi$.

In one aspect of the present disclosure, the phases of incident light including a light beam of a first wavelength and a light beam of a second wavelength that are different are matched, the incident light beams of the first wavelength and the second wavelength are polarized into the same polarization direction, a wavelength of the polarized incident light beam of the first wavelength is matched with a wavelength of the incident light beam of the second wavelength, a phase difference is adjusted to be $\pi$, the phase difference being between the incident light beam of the first wavelength and the incident light beam of the second wavelength, the wavelengths of which have been matched, and the incident light beam of the first wavelength and the incident light beam of the second wavelength having been adjusted such that the phase difference is $\pi$ are simultaneously received.

BRIEF DESCRIPTION OF DRAWINGS

FIG. 6 is an overhead view of an imaging device of the present disclosure.

FIG. 8 is a diagram for describing a phase adjustment unit.

MODE FOR CARRYING OUT THE INVENTION

Figure 1:
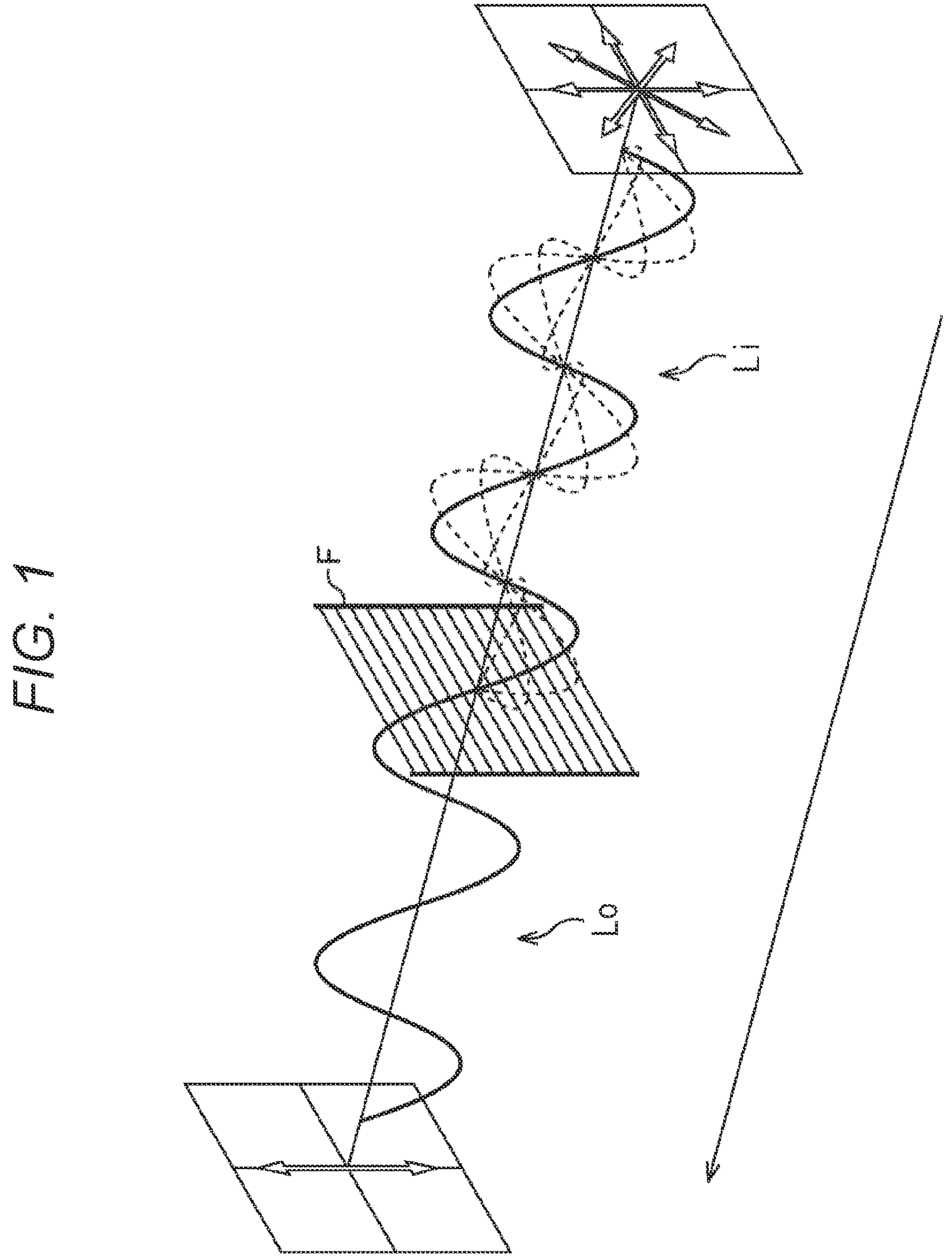
FIG. 1 is a diagram for describing polarized light.

Hereinafter, a preferred embodiment of the present disclosure will be described in detail with reference to the accompanying drawings. Note that in the present specification and the drawings, components having substantially the same functional configuration are denoted by the same reference numerals, and redundant explanations are omitted.

Preferred Embodiment (Example of Characteristics of Object Acquired from Image Groups of Different Wavelengths)

In particular, the present disclosure is directed to reduce a load on the signal processing and suppress decrease in processing speed by realizing a part of signal processing using an image signal optically.

In describing an imaging device of the present disclosure, an example of acquiring information regarding a characteristic of an object by performing arithmetic processing on image groups of different wavelengths will be described.

(NDVI)

It is known that an absorption rate of a leaf of a plant particularly with respect to red light (Red) and near infrared light (NIR) among light incident from the outside changes greatly depending on a growth situation.

Therefore, by imaging a leaf of a plant, images of a red light (Red) component and a near infrared light (NIR) component can be captured, and the growth situation can be acquired by arithmetic processing using both images.

As an index indicating the growth situation, a vegetation index (normalized difference vegetation index (NDVI)) is well known.

The vegetation index (NDVI) is defined as the following formula (1).

$$NDVI=(NIR-\text{Red})/(NIR+\text{Red}) \tag{1}$$

In measuring such a vegetation index, a color filter that transmits only light of a wavelength corresponding to red light and a color filter that transmits only light of a wavelength corresponding to near infrared light are installed in front of two different cameras, images of light of the respective wavelengths are captured, and addition and subtraction of the images of the respective wavelengths based on the formula (1) are realized by signal processing.

However, there is a possibility that the larger the image size and the higher the definition of the image, the larger the load on the signal processing and the lower the processing speed.

(Line-of-Sight Extraction)

In order to record a state of a driver of an automobile or the like, there is a technique of extracting a position of the pupil of the driver from an image and determining a line-of-sight direction of the driver by using a difference between reflection characteristics of the pupil with respect to two types of near infrared light of different wavelengths.

The technique utilizes a difference in reflection characteristics of the pupil with respect to two types of near infrared light of different wavelengths, and specifically the following configuration is provided.

That is, LEDs that emit two types of near infrared light of wavelengths of, for example, 850 nm and 950 nm are alternately arranged so as to surround the imaging direction of the imaging device, and the bright pupil image and the dark pupil image are captured with the imaging device while the LEDs are sequentially turned on with the wavelengths alternately switched. Then, a difference between the captured bright pupil image and dark pupil image is acquired by signal processing to cause features of the pupil to appear, thereby detecting the position of the pupil and identifying the line-of-sight direction.

Since this technique is a technique for safely driving an automobile, it is necessary to extract the position of the pupil quickly with high accuracy. However, as the image size of the captured image increases, the load on the signal processing increases and the processing speed decreases, so that a delay may occur.

(Observation of Chemical Reaction)

In the medical field, there is a technique in which a fluorescent agent is bound to a specific substance in a cell, and then excitation light is applied to observe the intensity and spatial distribution of fluorescence, thereby measuring the amount and intracellular distribution of the specific substance, and observing an intracellular chemical reaction.

One representative example of the technique is ratio observation of nerve cells. In the ratio observation, an information transmission process of a nerve cell is observed by utilizing a phenomenon in which an amount of calcium in a cell changes when a potential of the nerve cell changes.

In a state in which the nerve cell is not stimulated, the amount of calcium inside the cell is less than a predetermined value, and conversely, in a state in which the nerve cell is stimulated, the amount of calcium inside the cell increases to be more than the predetermined value.

In addition, in a case where the nerve cell is irradiated with excitation light beams of two specific types of wavelengths, when the amount of calcium inside the cell is smaller than a predetermined value, fluorescence caused by both the excitation light beams is weak, and the light amount difference therebetween is small, but when the amount of calcium inside the cell is larger than the predetermined value, fluorescence caused by the excitation light beam of either wavelength is strong, and the light amount difference therebetween is large.

Therefore, in the ratio observation, excitation light beams of two types of wavelengths are generated to capture two images, and a light amount difference between the captured two images is obtained by signal processing, thereby observing the electrical activity state of the nerve cell.

The ratio observation requires an observation result according to the reaction speed of the nerve cell, but as the image size of the image to be captured increases, the load on the signal processing increases, the processing speed decreases, and there is a possibility that a delay occurs with respect to the reaction speed of the nerve cell.

In any of the above, the signal processing on the image cannot be avoided. The signal processing itself is a simple four arithmetic operation, but when the spatial measurement resolution is improved, the measurement speed (frame rate) and the measurement resolution are traded off.

As long as such a trade-off relationship exists, there is a possibility that the ratio observation cannot be appropriately used particularly for applications requiring high speed and high resolution such as pupil detection of a driver or observation of nerve cells.

Therefore, in the present disclosure, by replacing part of the signal processing including the four arithmetic operations on the image described above with optical processing, a load on the signal processing is reduced, and both resolution enhancement and observation speed reduction are achieved.

<Polarization>

In order to realize the addition processing of images by signal processing, it is common to realize the addition processing by forming an image of a plurality of incident light beams of different wavelengths at the same spatial position with respect to the imaging element and observing the plurality of incident light beams simultaneously.

On the other hand, in the present technology, the subtraction processing of the images is performed by polarizing two incident light beams into the same direction, matching the wavelengths, shifting the two incident light beams such that the phase difference therebetween is π, and simultaneously observing the two incident light beams, thereby canceling the power of the two incident light beams and realizing the optical subtraction processing. Note that in the present disclosure, addition processing and subtraction processing among the four arithmetic operations between a plurality of images will be considered.

First, polarization will be described. In nature, light exists in a non-polarized state, and the light itself is in a wave state having a constant frequency and amplitude.

Here, as illustrated in FIG. 1, when a non-polarized incident light beam Li of a predetermined wavelength is transmitted through a polarizing plate F in the arrow direction, emitted light Lo having only a polarization component in a specific direction is extracted according to the shape of the polarizing plate F. As described above, the process of extracting the emitted light Lo including only the amplitude component in the specific direction from the non-polarized incident light beam Li is polarization.

In FIG. 1, it is illustrated that the incident light beam Li is a wave having amplitudes in various directions indicated by a solid line and dotted lines. In addition, it is illustrated that the emitted light Lo is a wave having only an amplitude in a direction indicated by the solid line.

<Subtraction Processing Using Phase Shift>

Figure 2:
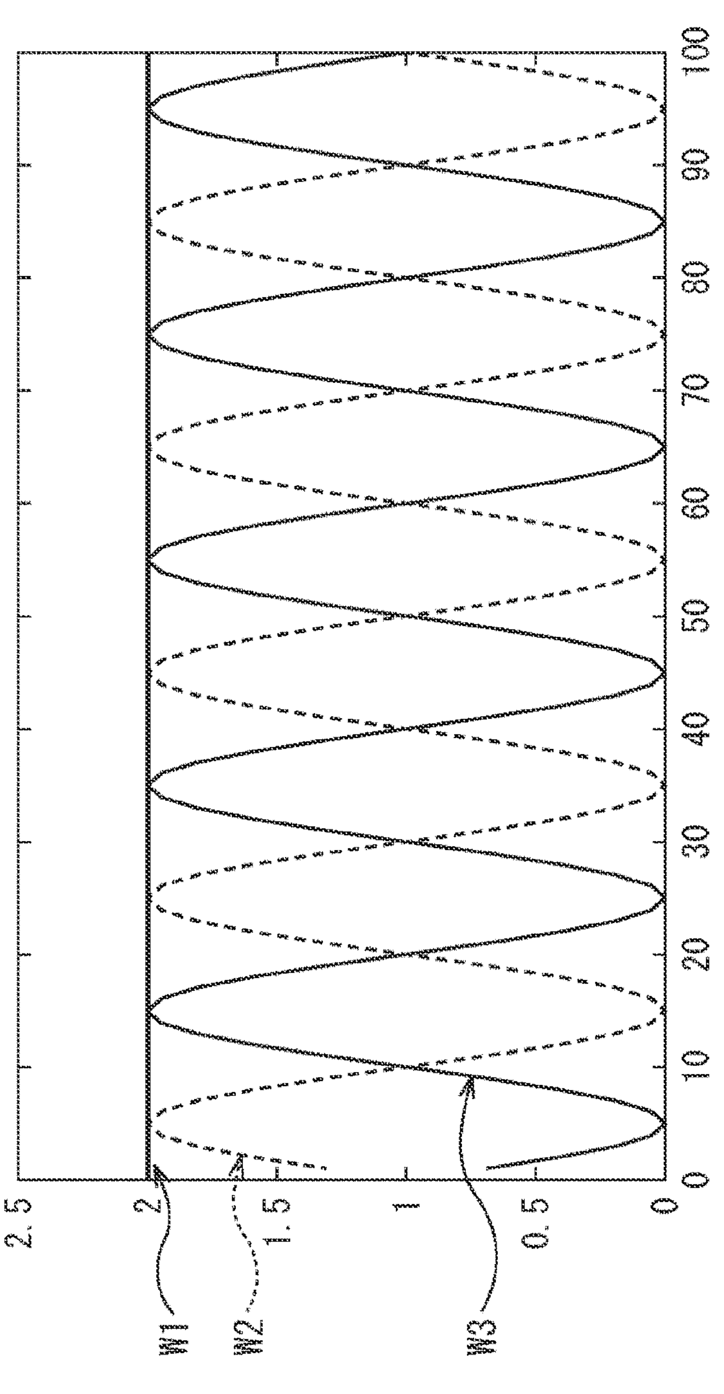
FIG. 2 is a diagram for describing an example of implementing virtual subtraction by canceling power of two incident light beams by utilizing a phase difference therebetween.

Next, as illustrated in FIG. 2, when two polarization components having the same wavelength and amplitude and having phases shifted from each other by π (rad) are simultaneously observed, the power of the observed light is the sum of the power in each phase of the two polarization components, but since the phases are shifted by π (rad), the amplitudes of the components are canceled in a pseudo manner so that light with an amplitude of 0 is observed, realizing optical subtraction processing of the two polarization components.

Note that in FIG. 2, a waveform W1 on the straight line is the maximum amplitude of the first incident light beam and the second incident light beam, a waveform W2 indicated by a dotted line is the waveform of the first incident light beam, and a waveform W3 indicated by a solid line is the waveform of the second incident light beam.

As illustrated in FIG. 2, the first incident light beam W1 and the second incident light beam W2 are polarized into the same direction, have the same wavelength and amplitude, and have phases shifted from each other by π (rad). Therefore, when the light beams are simultaneously observed, the first incident light beam W1 and the second incident light beam W2 are canceled (offset by) each other, and light having an amplitude of 0 is observed, that is, no light is observed. Subtraction processing of the first incident light beam and the second incident light beam is substantially realized.

<Wavelength Control Using Medium>

In order to obtain such a canceling effect, as described above, it is necessary that the first incident light beam and the second incident light beam, which are two incident light beams to be subjected to signal processing, are polarized into the same direction, have the same wavelength, and have phases shifted by π (rad).

Therefore, in the present disclosure, first, the wavelength of the incident light beam is controlled by using a characteristic generated when light enters a transparent medium that transmits light.

It is known that incident light beam of a predetermined wavelength has a characteristic that when it enters a medium having a predetermined refractive index, the wavelength of light is shortened in the medium according to Snell's law.

Figure 3:
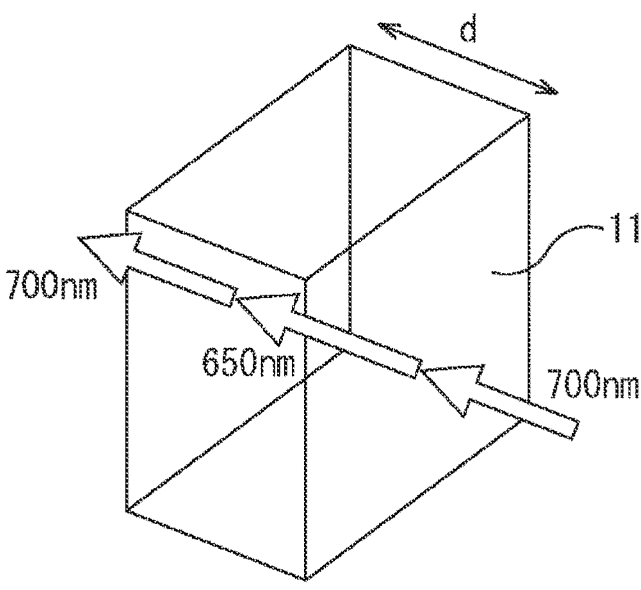
FIG. 3 is a diagram for describing a change in a wavelength at the time of transmission through a transparent medium.

For example, as illustrated in FIG. 3, in a case where incident light beam of a wavelength of 700 nm enters a medium 11 of, for example, glass having a refractive index n=1.0769 and a thickness d as a transparent medium that transmits light, the wavelength of the incident light beam changes from 700 nm to 600 nm in the medium 11, and the incident light beam again has the wavelength of 700 nm when the incident light beam has transmitted through the medium 11.

Therefore, the wavelength is controlled using the characteristic of the medium. More specifically, for example, as illustrated in FIG. 4, it is considered to match the wavelength of an incident light beam L1 of a wavelength $\lambda_1$ with a wavelength $\lambda_2$ of an incident light beam L2 using a medium 21 made of glass having a refractive index $n_1$.

Figure 4:
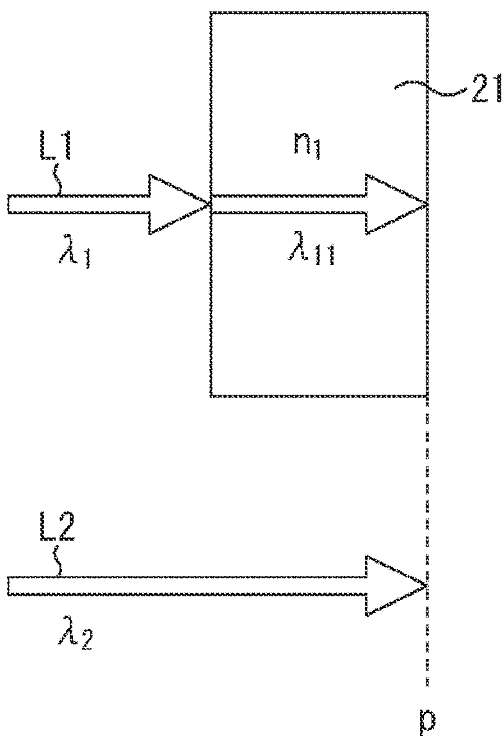
FIG. 4 is a diagram for describing a method of matching different wavelengths of two incident light beams to be the same wavelength.

For example, as illustrated in FIG. 4, the medium 21 made of glass having the refractive index $n_1$ is installed on the optical path of the incident light beam L1.

At this time, when the incident light beam L1 enters the medium 21, the wavelength $\lambda_1$ of the incident light beam L1 changes to a wavelength $\lambda_{11}$ according to the refractive index $n_1$ of the medium 21.

By setting the refractive index $n_1$ such that the wavelength $\lambda_{11}$ of the incident light beam L1 changes to the wavelength $\lambda_2$ when the incident light beam L1 has transmitted through the medium 21, the wavelength can be matched with the wavelength of the incident light beam L2. At this time, the necessary refractive index $n_1$ is defined by the following formula (2).

$$n_1 = \lambda_1/\lambda_2 \quad (2)$$

Therefore, with the configuration using the medium 21 having the refractive index $n_1$ that satisfies the relationship of formula (2) described above, both the incident light beams L1 and L2 are made to have the wavelength $\lambda_2$ at a position p in FIG. 4.

<Phase Control Method>

Next, a method of shifting the phases of two incident light beams from each other by π (rad) will be described.

It is considered to make the phase difference between the two incident light beams L11 and L12 π by controlling the phase of the incident light beam L12 among the two incident light beams L11 and L12 having matched phases.

Figure 5:
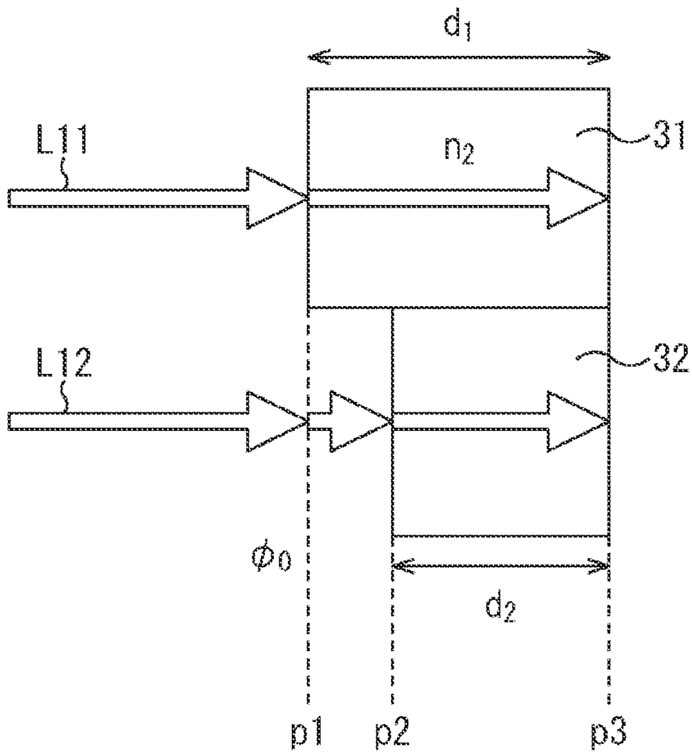
FIG. 5 is a diagram for describing a method of shifting phases of two incident light beams having matched phases and the same wavelength from each other such that a phase difference therebetween is $\pi$.

For example, as illustrated in FIG. 5, a medium 31 that is transparent to transmit light and made of, for example, glass that has the refractive index $n_2$ and a thickness $d_1$ is disposed on the optical path of the incident light beam L11, and a medium 32 having the same characteristic as that of the medium 31 and having a thickness $d_2$ ($<d_1$) is disposed on the optical path of the incident light beam L12.

With such a configuration, as illustrated in FIG. 5, assuming that both the phases of the incident light beams L11 and L12 are phases φ0 at a position p1 that is the front surface of the medium 31, the phase φ1 of the incident light beam L12 at a position p2 that is the front surface of the medium 32 is expressed by the following formula (3).

$$\varphi 1 = \varphi 0 + 2\pi(d_1 - d_2)/\lambda_1 \quad (3)$$

Consequently, the phase φa of the incident light beam L11 at the position p3 that is the bottom surface of the medium 31 and the phase φb of the incident light beam L12 at the position p3 that is the bottom surface of the medium 32 are expressed by the following formulas (4) and (5), respectively.

$$\varphi a = \varphi 0 + (2\pi n_2 d_1)/\lambda_1 \quad (4)$$

$$\varphi b = \varphi 0 + 2\pi(d_1 - d_2 + n_2 d_2)/\lambda_1 \quad (5)$$

Therefore, in a case where the thickness $d_1$ of the medium 31 is known, the phase difference between the incident light beams L11 and L12 can be π by determining the thickness $d_2$ of the medium 32 so as to satisfy φb=φa+π as expressed by the following formula (6).

$$d_2 = ((1 - n_2)d_1 - \pi)/(1 - n_2) \quad (6)$$

As described above, in the present disclosure, two incident light beams are simultaneously observed in the same space by polarizing the two incident light beams having matched, matching the wavelength of one of the incident light beams with the wavelength of the other incident light beam, and further, setting the phase difference between the one incident light beam and the other incident light beam to π.

Consequently, the power of the both incident light beams is canceled and observed, and as a result, optical subtraction processing of the power of the two incident light beams can be realized.

Configuration Example of an Imaging Device of Present Disclosure

Next, with reference to FIGS. 6 and 7, a configuration example of an imaging device to which the technology of the present disclosure is applied and which measures the power of two types of incident light beams having different wavelengths while optically adding and subtracting the incident light beams will be described.

Figure 7:
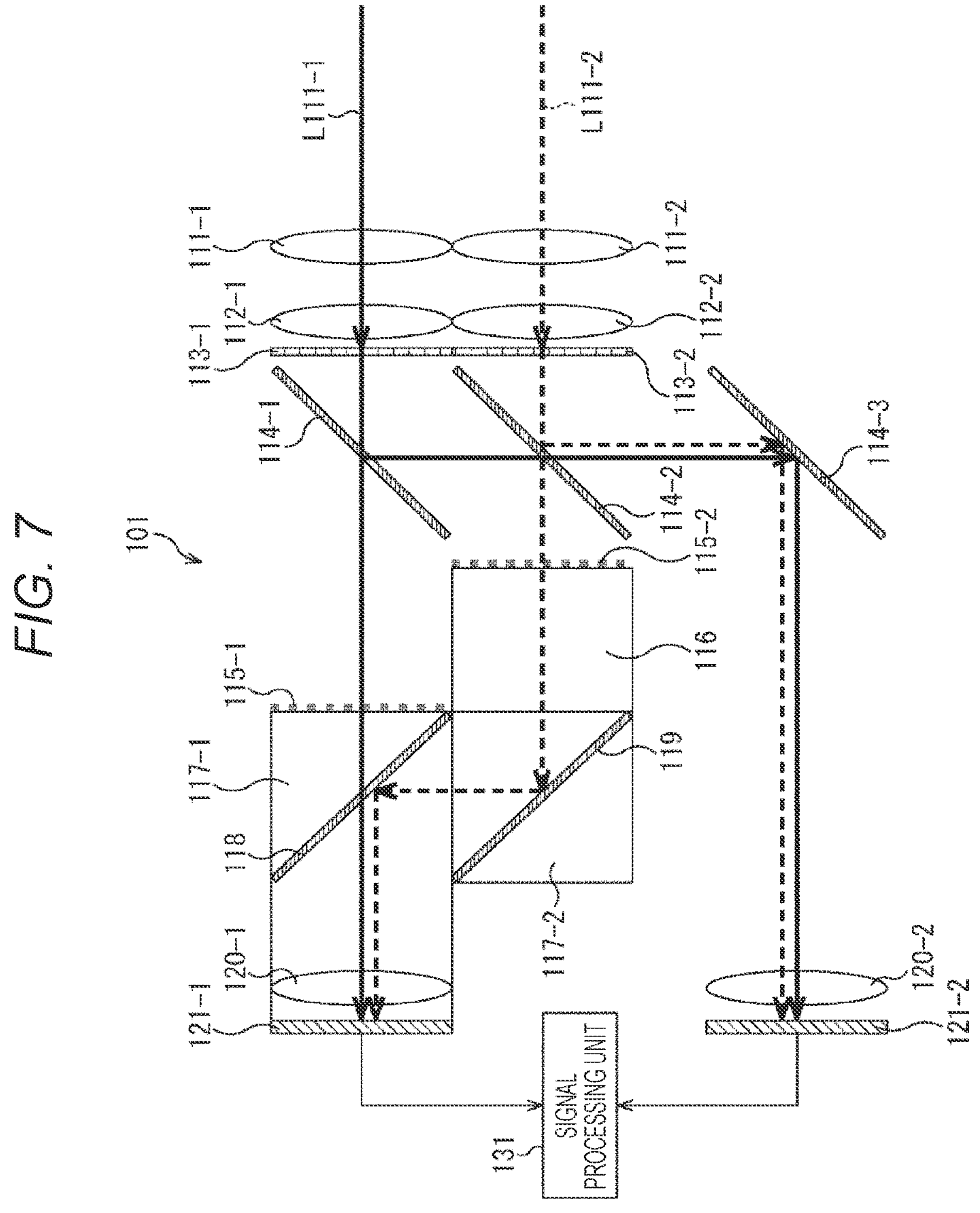
FIG. 7 is a top view of the imaging device of the present disclosure.

Note that FIG. 6 is an overhead view of the imaging device of the present disclosure, and FIG. 7 is a top view of the imaging device of the present disclosure.

An imaging device 101 of FIGS. 6 and 7 optically adds and subtracts the power of both the two types of incident light beams L111-1 and L111-2 having different wavelengths, and then captures an image, and performs signal processing based on the addition result and the subtraction result.

Note that in FIGS. 6 and 7, the incident light beams L111-1 and L111-2 are illustrated as solid and dotted arrows, respectively.

The imaging device 101 includes objective lenses 111-1 and 111-2, collimator lenses 112-1 and 112-2, color filters 113-1 and 113-2, half mirrors 114-1 to 114-3, and polarizing plates 115-1 and 115-2.

Moreover, the imaging device 101 includes mediums 116, 117-1, and 117-2, a half mirror 118, a mirror 119, image forming lenses 120-1 and 120-2, imaging elements 121-1 and 121-2, and a signal processing unit 131.

Note that hereinafter, in a case where it is not particularly necessary to distinguish the objective lenses 111-1 and 111-2, the collimator lenses 112-1 and 112-2, the color filters 113-1 and 113-2, the half mirrors 114-1 to 114-3, the polarizing plates 115-1 and 115-2, the mediums 117-1 and 117-2, the image forming lenses 120-1 and 120-2, and the imaging elements 121-1 and 121-2 from one another, they are also simply referred to as the objective lens 111, the collimator lens 112, the color filter 113, the half mirror 114, the polarizing plate 115, the medium 117, the image forming lens 120, and the imaging element 121, respectively, and other components are also similarly referred to.

The objective lenses 111-1 and 111-2 transmit and condense the incident light beams L111-1 and L111-2, respectively.

The collimator lenses 112-1 and 112-2 convert the incident light beams L111-1 and L111-2 transmitted through and condensed by the objective lenses 111-1 and 111-2 into parallel light beams. Note that the incident light beams L111-1 and L111-2 are converted into parallel light beams having the matched phases through transmission through the collimator lenses 112-1 and 112-2 by, for example, a function of a phase adjustment unit 141 and the like to be described later with reference to FIG. 8.

The color filters 113-1 and 113-2 filter through and transmit light beams of wavelengths corresponding to the incident light beams L111-1 and L111-2 having the matched phases, respectively.

The half mirrors 114-1 to 114-2 transmit parts of the incident light beams L111-1 and L111-2 transmitted through the color filters 113-1 and 113-2 toward the polarizing plates 115-1 and 115-2 in the subsequent stage, respectively, and reflect the other parts different from the parts toward the half mirror 114-3.

The half mirror 114-3 reflects sub parts of the other parts different from the parts of the incident light beams L111-1 and L111-2 transmitted toward the polarizing plates 115-1 and 115-2 to cause the reflected parts to enter the imaging element 121-2 via the image forming lens 120-2, and emits the other sub parts different from the sub parts to the outside. Note that illustration of a path of the light emitted to the outside is omitted.

The polarizing plates 115-1 and 115-2 are components corresponding to the polarizing plate F of FIG. 1 described above, and polarize parts of the incident light beams L111-1 and L111-2 into the same direction and cause the parts to enter the mediums 117-1 and 116, respectively.

The medium 116 is a component corresponding to the medium 21 described with reference to FIG. 4, and causes a wavelength of a part of the incident light beam L111-2 to be matched with a wavelength of a part of the incident light beam L111-1 in the medium 117-1 and to enter the medium 117-2.

More specifically, the medium 116 is made of a transparent medium that transmits light, the refractive index n is set to a value that matches the wavelength of the part of the incident light beam L111-2 with the wavelength of the part of the incident light beam L111-1 in the medium 117-1, and the medium 116 is, for example, glass having the refractive index n=1.1429.

That is, the medium 116 causes the parts of the incident light beams L111-1 and L111-2 to enter the mediums 117-1 and 117-2, respectively in a state where both the wavelengths are matched in the mediums 117-1 and 117-2.

The mediums 117-1 and 117-2 are components corresponding to the mediums 31 and 32 described with reference to FIG. 5, respectively, and shift the phase of a part of the incident light beam L111-2 by π (rad) with respect to the phase of a part of the incident light beam L111-1. More specifically, the mediums 117-1 and 117-2 are made of a transparent medium that transmits light and are, for example, glass having the refractive index n=1.0769.

That is, in the mediums 117-1 and 117-2, the optical path length of the incident light beam L111-1 transmitted through the medium 117-1 and the optical path length of the incident light beam L111-2 transmitted through the medium 117-2 are adjusted corresponding to the thicknesses d1 and d2 described above, so that the phase of the part of the incident light beam L111-2 is shifted by π (rad) with respect to the phase of the part of the incident light beam L111-1.

The mirror 119 is provided in the medium 117-2 and reflects a part of the incident light beam L111-2 toward the half mirror 118.

The half mirror 118 is provided in the medium 117-1, transmits a sub part of a part of the incident light beam L111-1 to cause the sub part to enter the imaging element 121-1 via the image forming lens 120-1, and reflects the other sub part different from the sub part of the part of the incident light beam L111-1 to emit the reflected part to the outside. Note that illustration of a path of the light emitted to the outside is omitted.

In addition, the half mirror 118 reflects a sub part of the part of the incident light L111-2 reflected by the mirror 119 to cause the sub part to enter the imaging element 121-1 via the image forming lens 120-1, and transmits the other part different from the sub part of the part of the incident light beam L111-2 to emit the other sub part to the outside. Note that illustration of a path of the light emitted to the outside is omitted.

The image forming lenses 120-1 and 120-2 and the corresponding imaging elements 121-1 and 121-2 are integrally configured, respectively.

The image forming lenses 120-1 and 120-2 condense the incident light beams L111-1 and L111-2 to form images on the imaging surfaces of the imaging elements 121-1 and 121-2, respectively.

The imaging elements 121-1 and 121-2 include, for example, a complementary metal oxide semiconductor (CMOS) image sensor, or a charge coupled device (CCD) image sensor, generate pixel signals corresponding to the amounts of the incident light beams L111-1 and L111-2 condensed via the image forming lenses 120-1 and 120-2, respectively, and output the pixel signals to the signal processing unit 131.

Consequently, the image forming lens 120-1 condenses the incident light beam L111-1 and the incident light beam L111-2 having a phase that is shifted by π (rad) with respect to the phase of the incident light beam L111-1 such that the light beams form images on the imaging element 121-1 and enter the imaging element 121-1.

By receiving the incident light beam L111-1 and the incident light beam L111-2 having the phase that is shifted by π (rad) with respect to the phase of the incident light beam L111-1, the imaging element 121-1 generates a pixel signal in a state in which the power of both the incident light beams L111-1 and L111-2 is optically canceled, that is, in a state in which the power is subtracted, and outputs the pixel signal to the signal processing unit 131.

By receiving the incident light beams L111-1 and L111-2 in a state where the phases are matched, the imaging element 121-2 generates a pixel signal in a state in which power of both the incident light beams are optically added, and outputs the pixel signal to the signal processing unit 131.

The signal processing unit 131 performs signal processing based on pixel signals serving as an imaging result supplied from the imaging elements 121-1 and 121-2, and outputs the processing result.

<Adjustment of Phase of Incident Light Beam>

As described above, in order to shift the phases of the incident light beams L111-1 and L111-2 from each other by π (rad), first, it is necessary to match the phases at the incident surface (position p1 in FIG. 5) of the medium that adjusts both the phases.

Figure 8:
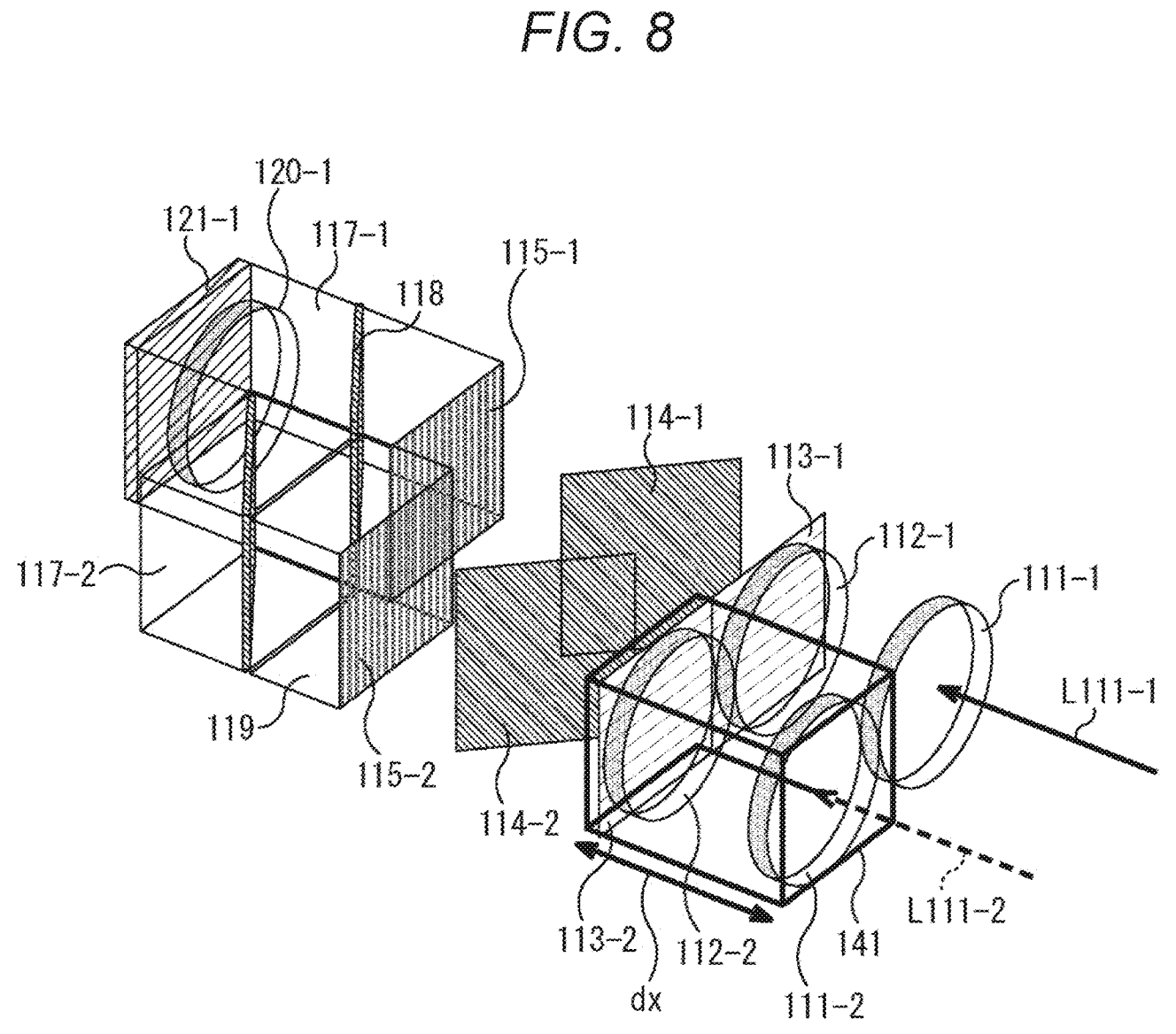

In matching the phases, for example, the phase adjustment unit 141 as illustrated in FIG. 8 may be provided. Note that in FIG. 8, only the configuration related to the path of light entering the imaging element 121-1 is illustrated, and the half mirror 114-3, the image forming lens 120-2, and the imaging element 121-2 are omitted.

The phase adjustment unit 141 is a unit that adjusts a distance dx between the objective lens 111-2 and the collimator lens 112, and can adjust the phase of the incident light beam finally entering the polarizing plate 115-2 by adjusting the optical path length of the incident light beam L111-2 by adjusting the distance dx.

Note that when adjusting the phase, laser light is made incident on both the objective lens 111-1 and 111-2 as the incident light beams, and the distance dx is adjusted so as to minimize the amount of light received by the imaging element 121-1, so that the phases of the incident light beams L111-1 and L111-2 transmitted through the collimator lenses 112-1 and 112-2 can be matched.

<Imaging Processing of Imaging Device>

Figure 9:
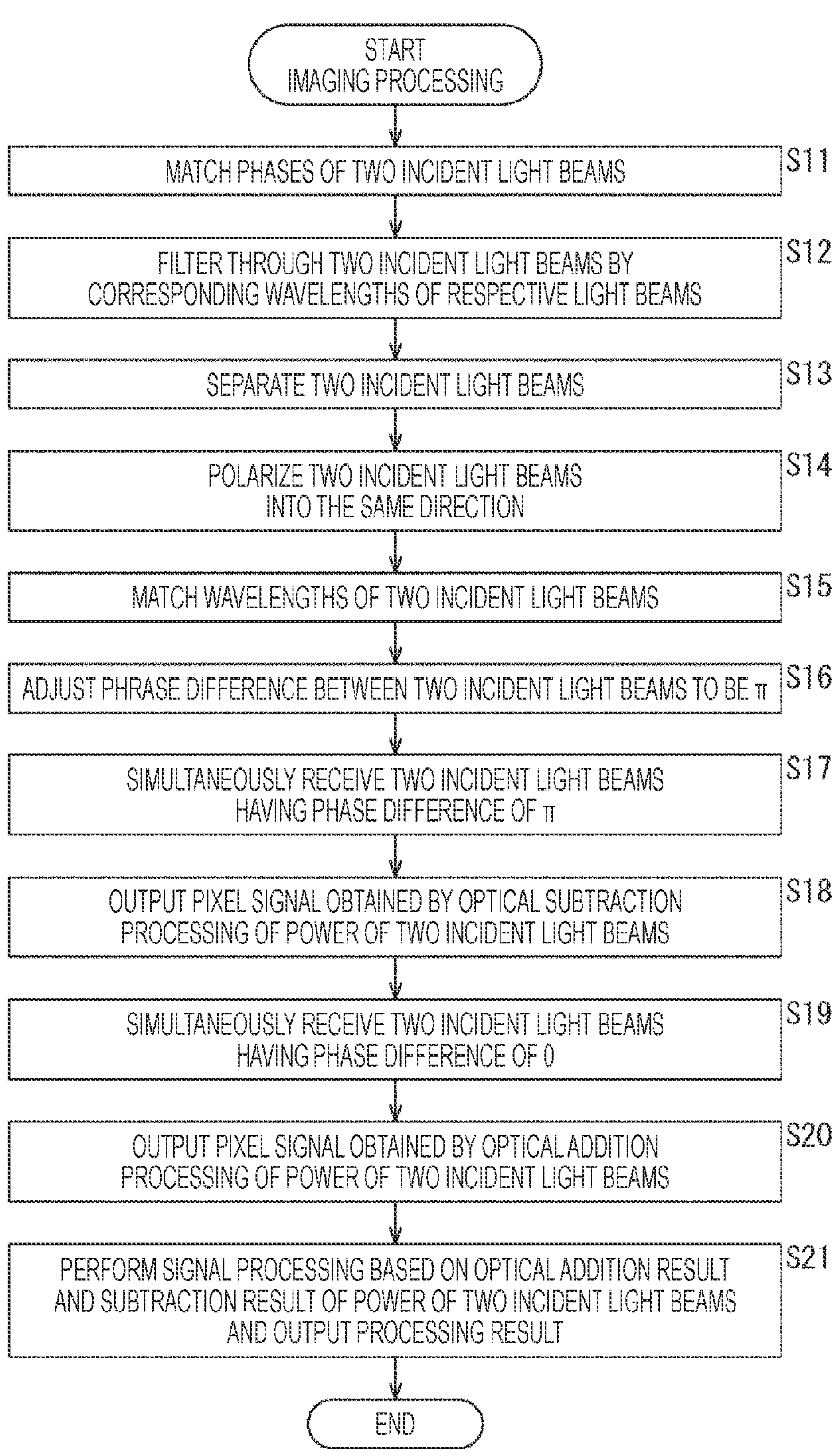
FIG. 9 is a flowchart illustrating imaging processing.

Next, imaging processing performed by the imaging device 101 of FIGS. 6 to 8 will be described with reference to a flowchart of FIG. 9. Note that it is assumed that the distance dx is adjusted in advance in the phase adjustment unit 141 such that the phases of the incident light beams L111-1 and L111-2 can be matched.

In step S11, when the incident light beams L111-1 and L111-2 having different wavelengths are incident on the objective lenses 111-1 and 111-2, the objective lenses 111-1 and 111-2 condense and transmit the incident light beams L111-1 and L111-2, respectively.

At this time, the phase adjustment unit 141 in which the distance dx between the objective lens 111-2 and the objective lens 112-2 is adjusted in advance matches the phases of the incident light beams L111-1 and L111-2.

In addition, the collimator lenses 112-1 and 112-2 convert the transmitted incident light beams L111-1 and L111-2 into parallel light beams, respectively.

In step S12, the color filters 113-1 and 113-2 filter through and transmit the incident light beams having wavelengths corresponding to the incident light beams L111-1 and L111-2, respectively.

In step S13, the half mirrors 114-1 and 114-2 allow parts of the incident light beams L111-1 and L111-2 to be transmitted through the polarizing plates 115-1 and 115-2, and reflect the other parts different from the parts toward the half mirror 114-3, so that the reflected parts are incident on the imaging element 121-1 side. With this processing, the incident light beams L111-1 and L111-2 are separated into the optical path on the imaging element 121-1 side and the optical path on the imaging element 121-2 side.

In step S14, the polarizing plates 115-1 and 115-2 polarize both the parts of the incident light beams L111-1 and L111-2 into the same direction to enter the mediums 117-1 and 116, respectively.

In step S15, the medium 116 matches the wavelength of the incident light beam L111-2 with the wavelength of the incident light beam L111-1 to have the same wavelength and causes the incident light beam L111-2 to enter the medium 117-2. That is, when entering the mediums 117-1 and 117-2, respectively, parts of the incident light beams L111-1 and L111-2 are in a state in which the wavelengths are matched with the wavelength of the incident light beam L111-1.

In step S16, the mediums 117-1 and 117-2 adjust the phase difference therebetween such that the phase of the incident light beam L111-2 is shifted by π (rad) with respect to the phase of the incident light beam L111-1.

At this time, in the medium 117-2, the mirror 119 reflects the incident light beam L111-2 to the half mirror 118.

In step S17, the half mirror 118 transmits a sub part of the part of the incident light beam L111-1, reflects a sub part of the part of the incident light beam L111-2, and causes the imaging element 121-1 to simultaneously receive the both via the image forming lens 120-1.

In step S18, the imaging element 121-1 receives the light amount in a state where the power of the incident light beams L111-1 and L111-2 is optically subtracted from each other. Consequently, the imaging element 121-1 outputs, to the signal processing unit 131, a pixel signal obtained from the subtraction result of the power of the incident light beams L111-1 and L111-2 from each other.

In step S19, the half mirror 114-3 reflects sub parts of the other parts different from the parts of the incident light beams L111-1 and L111-2 having the matched phases, that is, having the phase difference of 0, and causes the reflected parts to be incident on the imaging element 121-2 via the image forming lens 120-2 and to be received by the imaging element 121-2.

In step S20, the imaging element 121-2 receives the light amount in a state where the power of the incident light beams L111-1 and L111-2 is optically added to each other. Consequently, the imaging element 121-2 outputs, to the signal processing unit 131, a pixel signal obtained from the addition result of the power of the incident light beams L111-1 and L111-2 to each other.

In step S21, the signal processing unit 131 performs signal processing based on the addition result and the subtraction result of the power of the incident light beams L111-1 and L111-2 to/from each other, and outputs the processing result.

For example, in a case where two images including pixel signals that are imaging results of the power of the incident light beams L111-1 and L111-2 are supplied, it is necessary to perform addition processing and subtraction processing of the incident light beams L111-1 and L111-2 as a part of signal processing.

However, in the imaging device 101 of the present disclosure illustrated in FIGS. 6 to 8, it is possible to directly acquire the optically obtained addition result and subtraction result of the power of the incident light beams L111-1 and L111-2 to/from each other.

Consequently, the signal processing unit 131 of the present disclosure does not need to perform addition processing, subtraction processing, and the like of power of the incident light beams L111-1 and L111-2 to/from each other, and only needs to perform signal processing directly using the acquired addition result and subtraction result, so that a load on the signal processing can be reduced.

For example, in a case where the incident light beams L111-1 and L111-2 are infrared light and near infrared light, respectively, a subtraction result and an addition result of power of the infrared light and the near infrared light are supplied from the imaging elements 121-1 and 121-2, respectively, to the signal processing unit 131 of the imaging device 101 of the present disclosure.

Therefore, the signal processing unit 131 can acquire the subtraction result and the addition result of the power of the infrared light and the near infrared light when executing the signal processing according to the above-described formula (1), so that only division processing of the acquired subtraction result and addition result is needed.

In addition, for example, in a case where the incident light beams L111-1 and L111-2 are two types of near infrared light having wavelengths of, for example, 850 nm and 950 nm, a subtraction result and an addition result of power of the two types of near infrared light are supplied from the imaging elements 121-1 and 121-2 to the signal processing unit 131 of the imaging device 101 of the present disclosure.

Therefore, by irradiating the face or the like of a driver with two types of near infrared light and capturing images, the signal processing unit 131 can acquire a subtraction result of the two types of near infrared light as a difference between the bright pupil image and the dark pupil image. Therefore, it is possible to cause the features of the pupil to appear on the basis of the difference between the bright pupil image and the dark pupil image to detect the position of the pupil, and identify the line-of-sight direction.

Moreover, for example, in a case where the incident light beams L111-1 and L111-2 are excitation light of two types of wavelengths, a subtraction result and an addition result of power of the excitation light beams of the two types of wavelengths are supplied from the imaging elements 121-1 and 121-2 to the signal processing unit 131 of the imaging device 101 of the present disclosure.

Therefore, a fluorescent agent is bound to a specific substance in a cell, and then the excitation light beams are applied to observe the intensity and spatial distribution of the fluorescence, so that the signal processing unit 131 can observe the electrical activity state of the nerve cell on the basis of the subtraction result of the power of the excitation light beams of two types of wavelengths.

In any case, as a result, even when the resolution of the imaging elements 121-1 and 121-2 is higher and the size of the images is larger, the increase in the processing load on the addition processing and the subtraction processing is suppressed, so that the increase in the processing time related to the signal processing is suppressed, and the delay related to the processing can be suppressed. In addition, since the increase in the processing load is suppressed, the signal processing unit 131 can be configured at a lower cost, and the cost can be reduced.

Note that the present disclosure may have the following configurations.

<1> An imaging device including:

a phase adjustment unit that matches phases of incident light including a light beam of a first wavelength and a light beam of a second wavelength that are different;

a polarizing plate that polarizes the incident light beams of the first wavelength and the second wavelength into a same polarization direction;

a wavelength adjustment unit that matches a wavelength of the incident light beam of the first wavelength having been polarized by the polarizing plate with a wavelength of the incident light beam of the second wavelength;

a phase difference adjustment unit that adjusts a phase difference to be π, the phase difference being between the incident light beam of the first wavelength and the incident light beam of the second wavelength, the wavelengths of which have been matched by the wavelength adjustment unit; and a first imaging element that simultaneously receives the incident light beams of the first wavelength and the second wavelength having been adjusted by the phase difference adjustment unit such that the phase difference is π.

<2> The imaging device according to <1>, in which the wavelength adjustment unit is a transparent medium having a predetermined refractive index that transmits the incident light beam of the first wavelength.

<3> The imaging device according to <2>, in which the predetermined refractive index is $n_1=\lambda_1/\lambda_2$, where $n_1$ is a refractive index of the medium, $\lambda_1$ is the wavelength of the incident light beam of the first wavelength, and $\lambda_2$ is the wavelength of the incident light beam of the second wavelength.

<4> The imaging device according to <1>, in which the phase difference adjustment unit includes:

a first medium that is transparent and has a predetermined refractive index to transmit the incident light beam of the first wavelength, and has a first thickness in a transmission direction; and a second medium that transmits the incident light beam of the second wavelength, has a same characteristic as that of the first medium, and has a second thickness in the transmission direction.

<5> The imaging device according to <4>, in which when the first thickness is known, the second thickness is defined by $d_2=((1-n_2)d_1-\pi)/(1-n_2)$, where $d_1$ is the first thickness, $d_2$ is the second thickness, and $n_2$ is a refractive index of the first medium and the second medium.

<6> The imaging device according to <5>, in which the first thickness in the transmission direction is an optical path length of a first optical path that is an optical path of the incident light beam of the first wavelength in the transmission direction in the first medium and the second medium, and the second thickness in the transmission direction is an optical path length of a second optical path that is an optical path of the incident light beam of the second wavelength in the transmission direction in the first medium and the second medium.

<7> The imaging device according to <6>, further including:

a mirror that reflects an optical path of the incident light beam of the second wavelength to an optical path of the incident light beam of the first wavelength, on the second optical path; and a half mirror that transmits a part of the incident light beam of the first wavelength through the first imaging element and reflects a part of the incident light beam of the second wavelength reflected by the mirror toward the first imaging element, on the first optical path.

<8> The imaging device according to any one of <1> to <7>, further including:

a separation unit that separates each of the incident light beams of the first wavelength and the second wavelength having phases having been matched by the phase adjustment unit, into a part to be incident on the polarizing plate, and another part different from the part; and a second imaging element that is different from the first imaging element and that simultaneously receives the other parts of the respective incident light beams of the first wavelength and the second wavelength.

<9> The imaging device according to <8>, further including a half mirror that reflects a sub part of each of the other parts of the respective incident light beams of the first wavelength and the second wavelength toward the second imaging element to cause the second imaging element to receive the reflected light beams.

<10> The imaging device according to <8>, in which the first imaging element that simultaneously receives the incident light beam of the first wavelength and the incident light beam of the second wavelength having been adjusted by the phase difference adjustment unit such that a phase difference is π to output a pixel signal that has been optically subjected to subtraction processing of power of the incident light beam of the first wavelength and the incident light beam of the second wavelength, the second imaging element simultaneously receives the incident light beam of the first wavelength and the incident light beam of the second wavelength having the phases having been matched to output a pixel signal that has been optically subjected to addition processing of power of the incident light beam of the first wavelength and the incident light beam of the second wavelength, and the imaging device further includes a signal processing unit that performs signal processing based on the pixel signal having been subjected to the subtraction processing and the pixel signal having been subjected to the addition processing.

<11> The imaging device according to <10>, in which in a case where the incident light beam of the first wavelength and the incident light beam of the second wavelength are red light and near infrared light, respectively, the signal processing unit calculates a normalized difference vegetation index (NVDI), which is a vegetation index, by dividing the pixel signal having been subjected to the subtraction processing by the pixel signal having been subjected to the addition processing.

<12> The imaging device according to <10>, in which in a case where the incident light beam of the first wavelength and the incident light beam of the second wavelength are a first near infrared light beam and a second near infrared light beam, respectively, with which a driver's face is irradiated, the signal processing unit acquires the pixel signal having been subjected to the subtraction processing as a pixel signal that is a difference between a bright pupil image and a dark pupil image of the driver, causes a feature of the pupil to appear on the basis of the acquired pixel signal, which is a difference between the bright pupil image and the dark pupil image, to detect a position of the pupil and identify a line-of-sight direction of the driver.

<13> The imaging device according to <10>, in which in a case where the incident light beam of the first wavelength and the incident light beam of the second wavelength are an excitation light beam of the first wavelength and an excitation light beam of the second wavelength with which a specific substance is irradiated after a fluorescent agent is bound to the specific substance in a nerve cell, the signal processing unit acquires the pixel signal having been subjected to the subtraction processing as a pixel signal in a difference image when the specific substance is irradiated with the excitation light beam of the first wavelength and the excitation light beam of the second wavelength, and identifies an electrical activation state of the nerve cell on the basis of the acquired pixel signal of the difference image.

<14> The imaging device according to any one of <1> to <13>, in which the phase adjustment unit includes:

a first objective lens and a second objective lens on which the incident light beam of the first wavelength and the incident light beam of the second wavelength are incident, respectively; and a first collimator lens and a second collimator lens that convert the incident light beam of the first wavelength and the incident light beam of the second wavelength condensed by the first objective lens and the second objective lens, respectively, into parallel light beams, the phase adjustment unit adjusts either a distance between the first objective lens on which the incident light beam of the first wavelength is incident and the first collimator lens or a distance between the second objective lens on which the incident light beam of the second wavelength is incident and the second collimator lens to match the phases of the incident light beam of the first wavelength and the incident light beam of the second wavelength that are different.

<15> The imaging device according to <14>, in which on the phase adjustment unit, laser light is incident as incident light including a light beam of the first wavelength and a light beam of the second wavelength, and the phase adjustment unit adjusts a distance between the first objective lens and the first collimator lens or a distance between the second objective lens and the second collimator lens such that a light amount received by the first imaging element is minimized to match the phases of the incident light beam of the first wavelength and the incident light beam of the second wavelength.

<16> A method of operating an imaging device including:

a phase adjustment unit;

a polarizing plate;

a wavelength adjustment unit;

a phase difference adjustment unit; and an imaging element, the method including:

matching, by the phase adjustment unit, phases of incident light including a light beam of a first wavelength and a light beam of a second wavelength that are different;

polarizing, by the polarizing plate, the incident light beams of the first wavelength and the second wavelength into the same polarization direction;

matching, by the wavelength adjustment unit, a wavelength of the incident light beam of the first wavelength having been polarized by the polarizing plate with a wavelength of the incident light beam of the second wavelength;

adjusting, by the phase difference adjustment unit, a phase difference to be π, the phase difference being between the incident light beam of the first wavelength and the incident light beam of the second wavelength, the wavelengths of which have been matched by the wavelength adjustment unit; and simultaneously receiving, by the imaging element, the incident light beams of the first wavelength and the second wavelength having been adjusted by the phase difference adjustment unit such that the phase difference is π.

REFERENCE SIGNS LIST

101 Imaging device
111, 111-1, 111-2 Objective lens
112, 112-1, 112-2 Collimating lens
113, 113-1, 113-2 Color filter
114, 114-1; 114-0 Half mirror
115, 115-1 to 115-3 Polarizing plate
116 Medium
117, 117-1, 117-2 Medium
118 Half mirror
119 Mirror
120, 120-1, 120-2 Image forming lens
121, 121-1, 121-2 Imaging element
131 Signal processing unit
141 Phase adjustment unit

The invention claimed is:

1. An imaging device comprising:

a phase adjustment unit configured to match phases of incident light including a light beam of a first wavelength and a light beam of a second wavelength that are different;

a polarizing plate configured to polarize the incident light beams of the first wavelength and the second wavelength into a same polarization direction;

a wavelength adjustment unit configured to match a wavelength of the incident light beam of the first wavelength having been polarized by the polarizing plate with a wavelength of the incident light beam of the second wavelength;

a phase difference adjustment unit configured to adjust a phase difference to be π, the phase difference being between the incident light beam of the first wavelength and the incident light beam of the second wavelength, the wavelengths of which have been matched by the wavelength adjustment unit; and a first imaging element configured to simultaneously receive the incident light beams of the first wavelength and the second wavelength having been adjusted by the phase difference adjustment unit such that the phase difference is $\pi$, wherein the phase difference adjustment unit includes a first medium that is transparent and has a predetermined refractive index configured to transmit the incident light beam of the first wavelength, and has a first thickness in a transmission direction, and a second medium configured to transmit the incident light beam of the second wavelength, has a same characteristic as that of the first medium, and has a second thickness in the transmission direction, and wherein, when the first thickness is known, the second thickness is defined by $d_2=((1-n_2)d_1-\pi)/(1-n_2)$, where $d_1$ is the first thickness, $d_2$ is the second thickness, and $n_2$ is a refractive index of the first medium and the second medium.

2. The imaging device according to claim 1, wherein the wavelength adjustment unit is a transparent medium having a predetermined refractive index that transmits the incident light beam of the first wavelength.

3. The imaging device according to claim 2, wherein the predetermined refractive index is $n_1=\lambda_1/\lambda_2$, where $n_1$ is a refractive index of the medium, $\lambda_1$ is the wavelength of the incident light beam of the first wavelength, and $\lambda_2$ is the wavelength of the incident light beam of the second wavelength.

4. The imaging device according to claim 1, wherein the first thickness in the transmission direction is an optical path length of a first optical path that is an optical path of the incident light beam of the first wavelength in the transmission direction in the first medium and the second medium, and wherein the second thickness in the transmission direction is an optical path length of a second optical path that is an optical path of the incident light beam of the second wavelength in the transmission direction in the first medium and the second medium.

5. The imaging device according to claim 4, further comprising:

a mirror configured to reflect an optical path of the incident light beam of the second wavelength to an optical path of the incident light beam of the first wavelength, on the second optical path; and a half mirror configured to transmit a part of the incident light beam of the first wavelength to enter the first imaging element, and reflect a part of the incident light beam of the second wavelength reflected by the mirror toward the first imaging element, on the first optical path.

6. The imaging device according to claim 1, further comprising:

at least one half mirror configured to separate each of the incident light beams of the first wavelength and the second wavelength having phases having been matched by the phase adjustment unit, into a part to be incident on the polarizing plate, and another part different from the part; and a second imaging element that is different from the first imaging element and that simultaneously receives the other parts of the respective incident light beams of the first wavelength and the second wavelength.

7. The imaging device according to claim 6, wherein the at least one half mirror reflects a sub part of each of the other parts of the respective incident light beams of the first wavelength and the second wavelength toward the second imaging element to cause the second imaging element to receive the reflected light beams.

8. The imaging device according to claim 6, wherein the first imaging element that simultaneously receives at least a part of the incident light beam of the first wavelength and at least a part of the incident light beam of the second wavelength having been adjusted by the phase difference adjustment unit such that a phase difference of $\pi$ is configured to output a pixel signal that has been optically subjected to subtraction processing of power of the incident light beam of the first wavelength and the incident light beam of the second wavelength, wherein the second imaging element simultaneously receives the incident light beam of the first wavelength and the incident light beam of the second wavelength having the phases having been matched to output a pixel signal that has been optically subjected to addition processing of power of the incident light beam of the first wavelength and the incident light beam of the second wavelength, and wherein the imaging device further comprises a signal processing unit that performs signal processing based on the pixel signal having been subjected to the subtraction processing and the pixel signal having been subjected to the addition processing.

9. The imaging device according to claim 8, wherein in a case where the incident light beam of the first wavelength and the incident light beam of the second wavelength are red light and near infrared light, respectively, the signal processing unit calculates a normalized difference vegetation index (NVDI), which is a vegetation index, by dividing the pixel signal having been subjected to the subtraction processing by the pixel signal having been subjected to the addition processing.

10. The imaging device according to claim 8, wherein in a case where the incident light beam of the first wavelength and the incident light beam of the second wavelength are a first near infrared light beam and a second near infrared light beam, respectively, with which a driver's face is irradiated, the signal processing unit acquires the pixel signal having been subjected to the subtraction processing as a pixel signal that is a difference between a bright pupil image and a dark pupil image of the driver, causes a feature of the pupil to appear on a basis of the acquired pixel signal, which is a difference between the bright pupil image and the dark pupil image, to detect a position of the pupil and identify a line-of-sight direction of the driver.

11. The imaging device according to claim 8, wherein in a case where the incident light beam of the first wavelength and the incident light beam of the second wavelength are an excitation light beam of the first wavelength and an excitation light beam of the second wavelength with which a specific substance is irradiated after a fluorescent agent is bound to the specific substance in a nerve cell, the signal processing unit acquires the pixel signal having been subjected to the subtraction processing as a pixel signal in a difference image when the specific substance is irradiated with the excitation light beam of the first wavelength and the excitation light beam of the second wavelength, and identifies an electrical activation state of the nerve cell on a basis of the acquired pixel signal of the difference image.

12. The imaging device according to claim 1, wherein the phase adjustment unit includes a first objective lens and a second objective lens on which the incident light beam of the first wavelength and the incident light beam of the second wavelength are incident, respectively, and a first collimator lens and a second collimator lens that convert the incident light beam of the first wavelength and the incident light beam of the second wavelength having passed through condensed by the first objective lens and the second objective lens, respectively, into parallel light beams, and wherein the phase adjustment unit adjusts either a distance between the first objective lens on which the incident light beam of the first wavelength is incident and the first collimator lens or a distance between the second objective lens on which the incident light beam of the second wavelength is incident and the second collimator lens to match the phases of the incident light beam of the first wavelength and the incident light beam of the second wavelength that are different.

13. The imaging device according to claim 12, wherein on the phase adjustment unit, laser light is incident as incident light including a light beam of the first wavelength and a light beam of the second wavelength, and the phase adjustment unit adjusts a distance between the first objective lens and the first collimator lens or a distance between the second objective lens and the second collimator lens such that a light amount received by the first imaging element is minimized to match the phases of the incident light beam of the first wavelength and the incident light beam of the second wavelength.

14. A method of operating an imaging device including a phase adjustment unit, a polarizing plate, a wavelength adjustment unit, a phase difference adjustment unit, and an imaging element, wherein the method comprises:

matching, by the phase adjustment unit, phases of incident light including a light beam of a first wavelength and a light beam of a second wavelength that are different;

polarizing, by the polarizing plate, the incident light beams of the first wavelength and the second wavelength into a same polarization direction;

matching, by the wavelength adjustment unit, a wavelength of the incident light beam of the first wavelength having been polarized by the polarizing plate with a wavelength of the incident light beam of the second wavelength;

adjusting, by the phase difference adjustment unit, a phase difference to be $\pi$, the phase difference being between the incident light beam of the first wavelength and the incident light beam of the second wavelength, the wavelengths of which have been matched by the wavelength adjustment unit; and simultaneously receiving, by the imaging element, the incident light beam of the first wavelength and the second wavelength having been adjusted by the phase difference adjustment unit such that the phase difference is $\pi$, wherein the phase difference adjustment unit includes a first medium that is transparent and has a predetermined refractive index configured to transmit the incident light beam of the first wavelength, and has a first thickness in a transmission direction, and a second medium configured to transmit the incident light beam of the second wavelength, has a same characteristic as that of the first medium, and has a second thickness in the transmission direction, and wherein, when the first thickness is known, the second thickness is defined by $d_2=((1-n_2)d_1-\pi)/(1-n_2)$, where $d_1$ is the first thickness, $d_2$ is the second thickness, and $n_2$ is a refractive index of the first medium and the second medium.

* * * * *